April 5, 1932.   R. A. MOSS ET AL   1,852,467
FOLDING TOP FOR RUMBLE SEATS
Filed Jan. 7, 1929   2 Sheets-Sheet 1
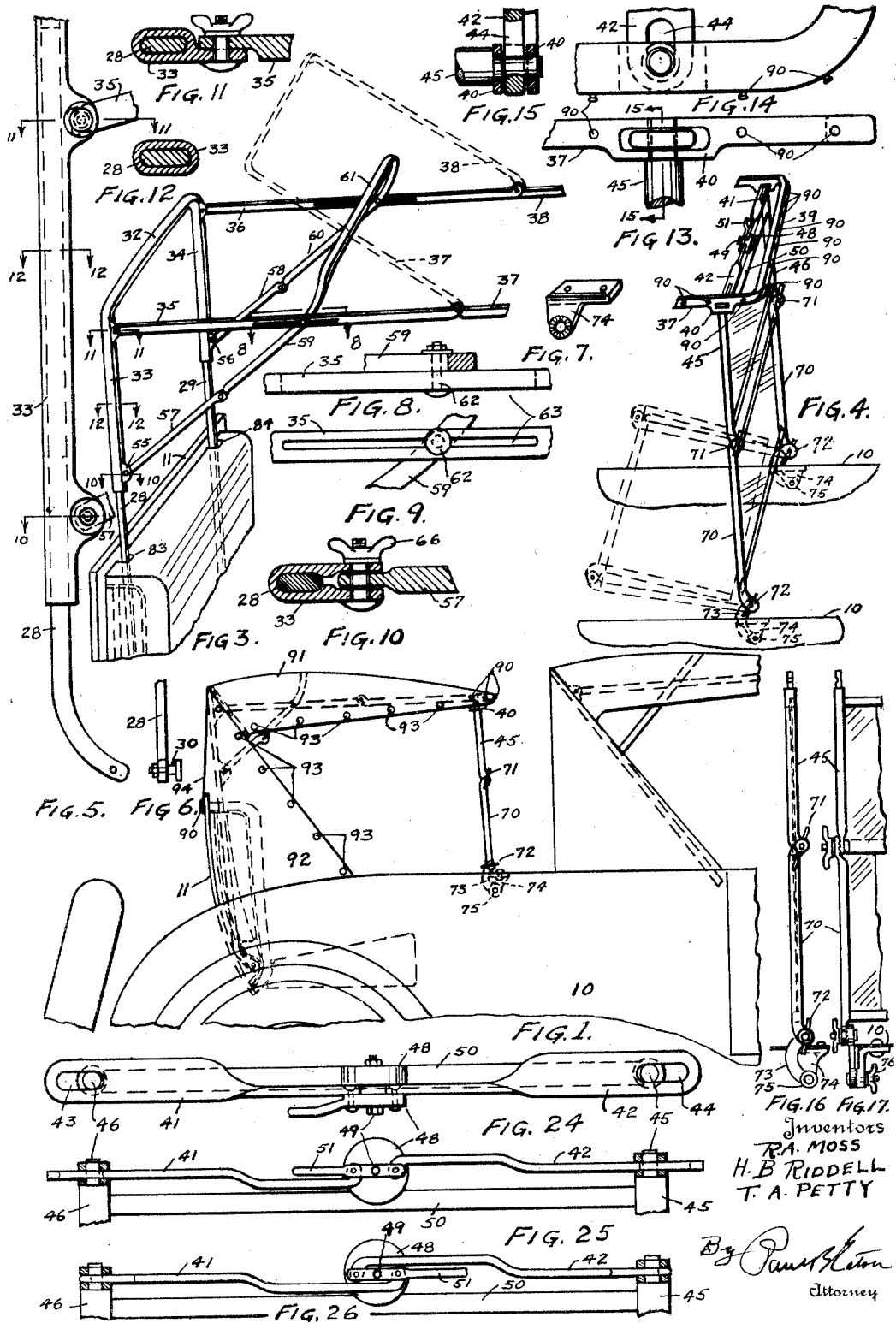
Inventors
R. A. MOSS
H. B. RIDDELL
T. A. PETTY
By Paul Heaton
Attorney

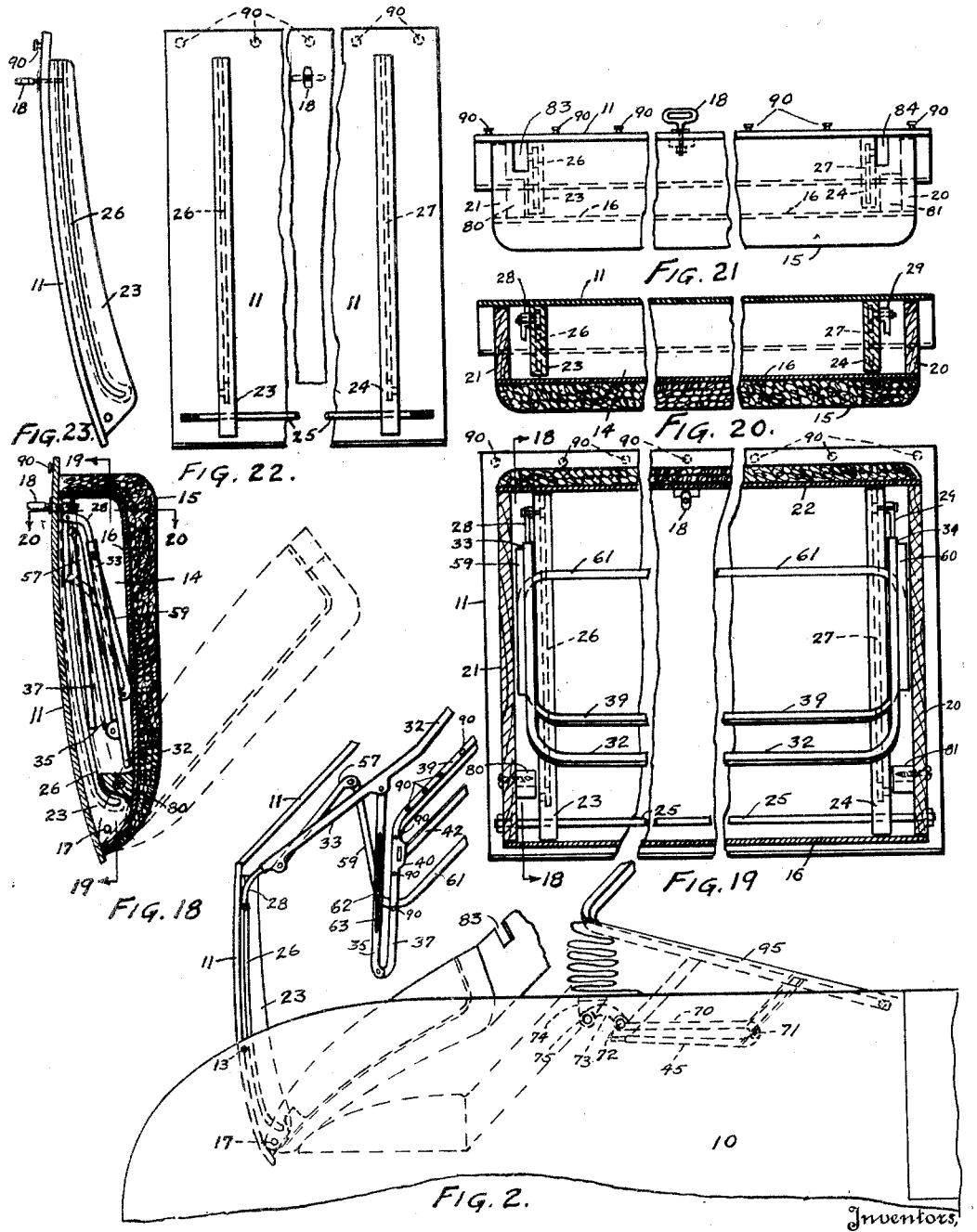

Patented Apr. 5, 1932

1,852,467

UNITED STATES PATENT OFFICE

ROBERT A. MOSS, HUGH B. RIDDELL, AND THOMAS A. PETTY, OF HIGH POINT, NORTH CAROLINA

FOLDING TOP FOR RUMBLE SEATS

Application filed January 7, 1929. Serial No. 330,762.

Our invention relates to a folding top for rumble seats and having means for folding same and tucking it away in the lid portion of the rumble seat of an automobile.

An object of our invention is to provide a folding top for rumble seats of automobiles, which folding top is adapted to be folded and tucked away in the lid for the rumble seat for the automobile.

Another object of our invention is to provide a rumble seat top for automobiles which can be folded and tucked away in the lid portion of the rumble seat of the automobile, said lid portion being adapted to be opened up to provided a compartment into which the folding top may be placed and then the seat may be readjusted so as to entirely encase a folded top.

Another object of our invention is to provide a folding top for rumble seats in automobiles in which the lid for the rumble seat of the automobile is adapted to have the cushioning part thereof hingedly connected to the lid so as to open forwardly from the lid and allow space for the top to be collapsed and folded in said place and after the top is thus folded then the cushioning portion of the lid can be snapped back in position to entirely obscure the top when it is desired not to use the same.

Some of the objects of our invention having been stated, other objects will appear as the description proceeds when taken in connection with the accompanying drawings in which—

Figure 1 is a side elevation of the rear portion of an automobile showing our folding top in place;

Figure 2 is a perspective view of the rear portion of an automobile showing the top partially collapsed.

Figure 3 is a perspective view of a portion of the top of the lid of a rumble seat for automobiles showing a portion of the collapsible top.

Figure 4 is a perspective view of the front portion of our collapsible top, and windshield.

Figure 5 is an enlarged side elevation of the supporting means for said top.

Figure 6 is an edge view of the lower end of Figure 5.

Figure 7 is a perspective view of the lug to which the windshield is secured.

Figure 8 is an enlarged plan view taken along the line 8—8.

Figure 9 is a side elevation of Figure 8.

Figure 10 is a cross-sectional view taken along the line 10—10 in Figure 3.

Figure 11 is a cross-sectional view taken along the line 11—11 in Figure 5.

Figure 12 is a cross-sectional view taken along the line 12—12 in Figure 5.

Figure 13 is an enlarged side elevation of the top of the windshield and the forward portion of the collapsible top.

Figure 14 is a plan view of Figure 13.

Figure 15 is a cross-sectional view taken along the line 15—15 in Figure 13.

Figure 16 is an edge view of the windshield for our collapsible top.

Figure 17 is a front elevation of one side of the windshield for the collapsible top.

Figure 18 is a cross-sectional view taken along the line 18—18 in Figure 19.

Figure 19 is a cross-sectional view taken along the line 19—19 in Figure 18.

Figure 20 is a cross-sectional view taken along the line 20—20 in Figure 18.

Figure 21 is a plan view of the top of the lid for the rumble seat showing the same in folded position.

Figure 22 is a front elevation of the lid for the rumble seat with the cushioning and collapsible top removed.

Figure 23 is an edge end view of the lid portion of the rumble seat.

Figure 24 is a plan view of the fastening means for securing the forward portion of the top to the windshield.

Figure 25 is a rear elevation of Figure 24.

Figure 26 is a view similar to Figure 25 showing the top secured to the windshield.

Referring more particularly to the drawings the numeral 10 indicates the body portion of an automobile which has the rumble seat lid portion 11 which is pivotally secured in the body portion of the automobile as at 13 and is adapted to be opened upwardly and backwardly as is conventional in all automobiles having a rumble seat. All automobile rumble seats have a cushioning secured to a lid portion but ours provides a special cushion which has the compartment 14 therein with the cushioning 15 on top thereof and this compartment has the supporting member 16, which is pivotally secured as at 17 and has a latch, 18 to secure the same in closed position to the lid of the rumble seat.

The supporting member 16 has the end portions 20 and 21 and the top portion 22 to form the compartment 14, and secured to the lid portion 11 are the strips 23 and 24 and through the lower end of the strips 23 and 24 is the rod 25 which penetrates the lower ends of the members 20 and 21 and acts as a pivot for the cushion and the associated parts. The members 23 and 24 have the vertically disposed grooves 26 and 27 therein in which the rods 28 and 29 are adapted to be supported. These rods 28 and 29 have the projections 30 thereon which fit into the T-shaped slots 26 and 27, the projection 30 being adapted to slide upwardly and downwardly in the blocks 26 and 27. We provide the U-shaped bow member 32 which has the hollow leg portions 33 and 34 said leg portions 33 and 34 being adapted to fit over the upper end of the rods 28 and 29.

Pivotally secured to the upper end of the U-shaped member 32 are the members 35 and 36, which have pivotally secured to their forward ends, members 37 and 38, which members 37 and 38 merge into the member 39, forming the forward end of the top. The forward portions of the members 37 and 38 have the enlarged portions 40 which are slotted to receive the ends of the members 41 and 42 which have the slots 43 and 44 therein which fit over the upper end of the members 45 and 46 which form the frame for the upper portion of the windshield. These members 41 and 42 are secured to a circular member 48 which is rigidly mounted in the center of member 50 which forms the upper half of the windshield. The mounting arrangement for the members 41 and 42 comprises the lever 51 pivotally mounted on the pin 49, and the members 41 and 42 are pivotally secured to this lever so that when it is thrown in the position shown in Figure 25 no clamping effect will be exerted, but when in the position shown in Figure 26 it will hold the forward portion of the top to the upper portion of the windshield.

Pivotally secured as at 55 and 56 are the members 57 and 58 which have pivotally connected to them members 59 and 60 which have their forward portions merged into the bow 61 and these members 60 and 59 have the projections 62 thereon which slide in the slot 63 in the members 35 and 36.

When the member 32 is in raised position the nut 66 is tightened which will clamp the leg portions 33 and 34 securely in position on the rods 28 and 29 and thus hold the top in elevated position.

We provide a specially made windshield which comprises the upper portion 45, as previously described, and the lower portion 70, which is pivotally secured to the upper portion of the windshield as at 71, and the portion 70 is pivotally secured to a bracket as at 72, said bracket being indicated by the numeral 73, which bracket 73 is pivotally secured to the lug 74 as at 75, by means of the thumb nut 76. In Figure 17 it is clearly shown how the bracket 74 is secured to the portion 10 of the automobile body, and how the bracket 73 is secured thereto. This arrangement permits the windshield to be broken down and folded beneath the body portion of the automobile in front of the rumble seat compartment as is clearly shown in dotted lines in Figure 2.

When it is desired to fold the top, the rods 28 and 29 are pulled upwardly until the projections 30 fit in the upper ends of the slots 26 and 27, and then the U-shaped member 32 is slid downwardly after the thumb nuts 66 have been loosened, and the top is broken downwardly in the center, and the members 37 and 38 fit on top of the members 35 and 36, and the members 57, 58, 59 and 60 are pushed upwardly, as shown in Figure 2, and the portion 61 moves forwardly and downwardly, and in this way the whole skeleton work of the top is folded in the position shown in Figure 18. All of this folding is done after the canvas top is removed from the skeleton work, or the top cover 91 may be made of any other suitable material.

It might be added that when the top is in raised position as shown in Figure 1, the rods 28 and 29 are prevented from moving upwardly by means of the projections 20 and 81, secured on the members 20 and 21, which fit over the lower ends of the rods 28 and 29 and thus prevent their upward movement.

It is also apparent that the portion 22 of the cushion section has the notches 83 and 84 therein to fit over the upper ends of the rods 28 and 29 when the top is in raised position.

On the rumble seat lid 11 and on the edge portions of the top members, we have shown snap buttons 90 to which the top portion 91 is adapted to be snapped when the top framework is raised and the top is desired to be used, and when it is not desired to use the top and side curtains, then they can be easily removed and folded away with the skeleton top in the compartment provided for the storing of the skeleton top.

We have shown the partial side curtains 92, but we desire it to be understood that additional side curtains may be provided to entirely enclose the occupants of the rumble seat, and these can be snapped onto the places provided on the top and partial side curtains, which snaps are shown by the reference character 93.

In Figure 2 we have shown the rumble seat top in connection with a roadster, and this is also the case in Figure 1, but we desire it to be understood that our invention may be used on any automobile having a rumble seat, regardless of the type of automobile, and this is made possible by having the special windshield, which permits our top to be secured to any type of automobile having a rumble seat.

The top 91 and the back curtain 94 may be integral with each other, or they can be separate, as desired.

In the drawings and specification we have set forth a preferred embodiment of our invention, and although specific terms are used they are employed in a generic and descriptive sense only and not for purposes of limitation, the scope of the invention being set forth in the appended claims:

1. In an automobile having a rumble seat, a lid for the rumble seat, the cushioning material of the lid being pivotally secured to the lower portion of the lid, a hollowed out portion in the back of the cushioning portion, vertically disposed members secured to the forward portion of the lid and having grooves therein, standards adapted to slide in said grooves, the upper ends of said standards being adapted to support the frame work of the top, forwardly projecting members secured to the frame work mounted on the standards, a windshield adapted to be secured to the automobile body, the forward end of the members secured to the rear portion of the top being adapted to be secured to the windshield, all of said structure being adapted to be folded and tucked away in the compartment in the cushioning portion when not in use.

2. In a top for a rumble seat of automobiles, a lid portion for the rumble seat, a cushioning portion pivotally secured to the forward portion of the lid portion, a hollowed out portion in said cushioning portion, vertically disposed standards slidably secured to the forward portion of the lid portion, a collapsible frame work adapted to support a top secured on said standards, a windshield on the body portion of the automobile in front of the rumble seat, and means associated with the frame work and the top for securing the said forward portion of the top to the windshield.

3. In an automobile having a rumble seat and a lid for said rumble seat, a cushion for said lid hingedly secured to the lower front side of said lid when the lid is in raised position and forming a compartment between said lid and said cushion, means for releasably securing the top of said cushion to said lid, members secured at each forward side of the lid portion and each having a channel therein, a standard slidably mounted in each of said channels, a top support adjustably secured to said standards, and a foldable top framework pivotally secured to said top support.

4. In an automobile having a rumble seat and a lid for said rumble seat, a cushion for said lid hingedly secured to the lower front side of said lid when the lid is in raised position and forming a compartment between said lid and said cushion, means for releasably securing the top of said cushion to said lid, members secured at each forward side of the lid portion and each having a channel therein, a standard slidably mounted in each of said channels, a top support adjustably secured to said standards and a foldable top framework pivotally secured to said top support, said top framework when folded being adapted to be raised upwardly, and said standards being adapted to be slid upwardly in said channels, and the said standards, said top supports and said top framework stowed in the said cavity between the cushion and rumble seat lid.

In testimony whereof we affix our signatures.

ROBERT A. MOSS.
HUGH B. RIDDELL.
THOMAS A. PETTY.